July 23, 1957 H. M. STIEGLITZ 2,800,613
PANEL BOARDS

Filed March 22, 1954 2 Sheets-Sheet 1

INVENTOR;
HENRY M. STIEGLITZ,

BY Bruninga and Sutherland,
ATTORNEYS.

July 23, 1957 H. M. STIEGLITZ 2,800,613
PANEL BOARDS
Filed March 22, 1954 2 Sheets-Sheet 2

INVENTOR;
HENRY M. STIEGLITZ
ATTORNEYS.

United States Patent Office 2,800,613
Patented July 23, 1957

2,800,613

PANEL BOARDS

Henry M. Stieglitz, St. Louis, Mo., assignor to Frank Adam Electric Company, St. Louis, Mo., a corporation of Missouri Application March 22, 1954, Serial No. 417,670

4 Claims. (Cl. 317—120)

This invention relates to panelboards, and is directed more specifically to the provision of a feeder distribution panelboard that can be made up by contractors from stock parts.

Branch circuits supplied from a typical feeder distribution center will vary in capacity and character. Their overcurrent protection and disconnect devices (herein referred to as branch units) are mounted within a cabinet to form a panelboard, and these units necessarily differ in size and shape according to the capacity and character of the branch circuits to which the units are connected. For this reason, feeder distribution panelboards heretofore have been custom built or manufactured to order. A more satisfactory procedure would be that in which the panelboard is assembled by the customer's contractor from stock parts; and some progress has been made in this direction, especially with reference to the mounting back and branch units, but the cover for the cabinet presents a stumbling block.

The typical panelboard comprises a cabinet, a mounting back within the cabinet holding a number of branch units, and a cover framing the assembled units, thereby to enclose the gutter space about the mounting back but permit access to the panel front for replacement of fuses, operation of switches and the like. Standard mounting backs have been designed to accommodate branch units of varying size and shape in sections of a predetermined width corresponding to that of the mounting back. Edge mounting of the bus bars and multiposition fasteners along the sides of the mounting back permit such sections to be "plugged on" without regard to their individual differences in vertical dimension, but the over-all height of a finished assembly (panel front) varies from job to job, depending upon the number and type of the branch units required. It has heretofore been customary to complete the assembly and then cut the cover opening, a tailoring practice which the average contractor is not equipped to do.

It is accordingly an object of the present invention to provide a panelboard that permits the use of a stock cover frame, the opening of which is of predetermined size. To that end, an adjustable space cover is adjustably positioned on the mounting back to fit snugly against the lowermost branch units or space cover. In practice, the upper edge of the panel front is predetermined to correspond with the upper edge of the cover frame opening, but an adjustable space cover used in connection with the branch unit sections and other space covers carries the lower edge of the panel front beyond the lower edge of the cover frame opening.

More particularly, the cover frame is provided with inwardly projecting flange members about the opening, which flange members are adapted to bound the upper edge and side edges of the panel front, thereby serving to position the cover frame and temporarily hold it in position while fastening screws are inserted. (Because of its weight and thinness, the cover frame is otherwise difficult to hold in position.) The front surface of the adjustable space cover is inwardly offset with respect to the front surface of the branch units, thus permitting the space cover to project beneath the lower flange member of the cover frame.

Other features of the invention will be in part apparent from and in part pointed out in the following detail description taken in connection with the accompanying drawings, in which.

Figure 1:
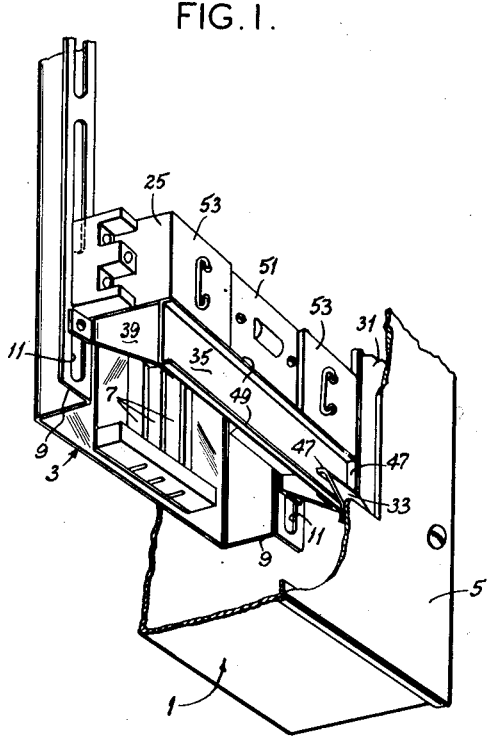
Fig. 1 is an oblique view illustrating a portion of a panelboard cabinet of this invention.
Figure 4:
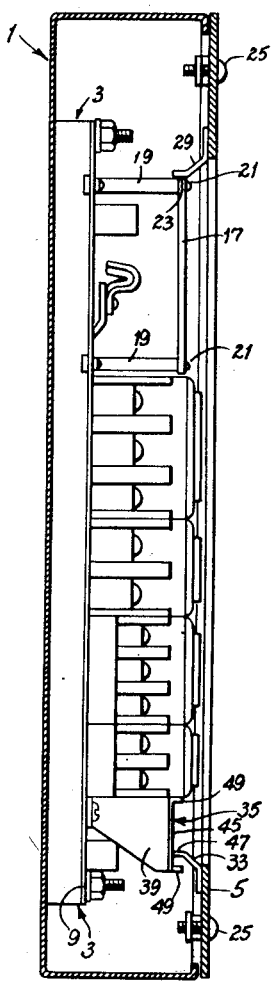
Fig. 4 is a vertical section taken on the line 4—4 of Fig. 2 with the cover shown.
Figure 2:
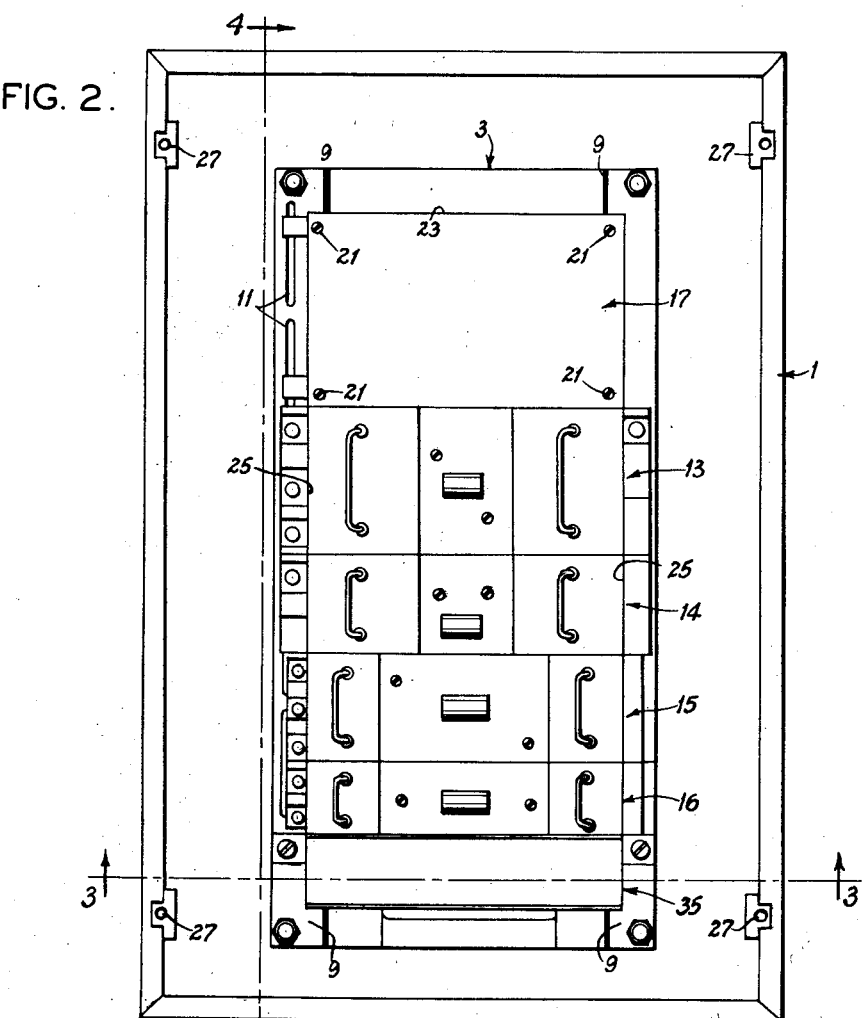
Fig. 2 is a front elevation of the cabinet, the cover having been removed.
Figure 3:
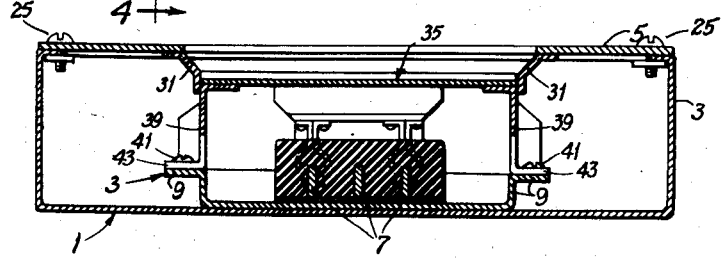
Fig. 3 is a horizontal section taken on the line 3—3 of Fig. 2 with the cover in place.

It will be understood that the prior practice of factory assembly of panelboard cabinets has disadvantages because of the delay inherent and the relatively high cost of the special tailoring operations involved with such practices. This invention accordingly contemplates that such panelboards will be stocked by the manufacturer's distributors and delivered over the counter to contractors in completed condition but for the inclusion of branch units. The contractor will select the particular units required for the job and assemble them within a standard cabinet having a mounting back and front cover frame of predetermined size. For example, two-pole units in different ratings, as well as three-pole units also differing in rating, will all be usable in various arrangements with a stock cabinet, mounting back and cover frame, which are supplied as a finished unit.

Referring now to the drawings, there is shown a panelboard comprising an open-front metal cabinet 1, a mounting back 3 fixed within the cabinet, and a front cover frame 5. The mounting back contains bus bars 7 supported on edge and has raised flanges 9 at its sides. Elongate screw-receiving openings 11 along the flanges 9 permit attachment of the branch units at any point along the back. The units in turn are adapted for making a plug-on connection with the edge-mounted bus bars at any point therealong.

The branch units may comprise circuit breakers, hinged disconnect switches or pullable fuse holders of the circuit disconnect type. They are supplied as single or twin-unit sections of a width corresponding to that of the mounting back so as to fit on the flanges 9. Variations in height will exist, however. For example, a triple-pole sixty amp. fuse section might extend four and one-half inches in the vertical direction, whereas a two-pole section of the same capacity would be only three inches high. Thirty amp. sections would be smaller, the three-pole type being three and three-eighths inches in vertical dimension and the two-pole type being two and one-fourth inches in height. Such twin-unit sections are shown at 13, 14, 15 and 16, the smaller units being mounted at the bottom.

In addition to these branch units, frequently there will be a solid blank plate 17 mounted on legs 19 at the top of the mounting back to cover the wire connectors on the bus bars and a neutral phase connector (if required). In practice, the cabinet 1 will be delivered with a suitable mounting back fixed therein and the blank plate 17 releasably held by screws 21. The branch devices 13, 14, 15 and 16 would not be included, but instead would be selected and installed by the contractor to fit the needs of the particular job. In completed assembly, the parts 13-17 form a panel front, the upper edge 23 and the side edges 25 of which are predetermined, but which are spaced inwardly from the top and sides of the cabinet. The space about the assembly or panel front constitutes a gutter for the connecting wiring and is enclosed by the cover frame 5.

This cover frame is delivered with the cabinet and is secured by screws 25, which cooperate with threaded fasteners 27 at the sides of the cabinet. A central opening is cut therein by the manufacturer and flange-like members are fixed about the opening to project inwardly and act as a rabbet for a door. Generally, a door will be hinged to close this opening, hence it is a considerable convenience to have a standard size of opening. In accordance with this invention, an upper flange member 29 is mounted to overlie and abut against the upper edge of the plate 17 applied by the manufacturer, and side flange members 31 are fixed to overlie and fit snugly with the sides of the panel front, which, although not completed, necessarily is of predetermined width. The location of the lower flange 33 is somewhat arbitrary, but generally corresponds with the lower end of the mounting back.

The several flange members 29, 31 and 33 may be in part beveled to form a neat frame, but more significantly, the inward flanges permit the cover to be temporarily hung in place while the screw fasteners 27 are inserted. Heretofore, difficulty has been encountered in holding such a thin, heavy metal piece while inserting the screws. Herein, the upper flange member 29 rests on the plate and the side flanges 31 position the cover, thereby facilitating installation.

It will be understood that an exact match of the finished panel front with the bottom 33 of the cover opening seldom occurs, because of the variations in the branch units. Even when the mounting back is filled, there generally is a small gap left. Also, space is frequently provided for addition of branch units in order to permit future expansion of the branch wiring system, and the space left at the bottom of the panel front is substantial. The panelboard herein disclosed accordingly makes use of an adjustable panel-front extender or space cover 35 of predetermined dimensions to enclose the remaining space or gap.

There may be several space covers when the number of branch-circuit units does not fill the cabinet, but the lowermost space cover is adjustably secured to the mounting back. The space cover 35 is made up with a channel section facing outwardly and with end walls 39 projecting inwardly for attachment by means of screws 41 and ears 43 to the mounting back. As supplied by the manufacturer, it may be of a width corresponding to that of the cover opening and of standard vertical dimension corresponding to that of the smallest branch unit, for example, two and one-fourth inches. Moreover, the lower adjustable space cover is adapted to extend below the flange 33 defining the lower edge of the cover frame opening and close any remaining gap, regardless of its vertical dimension.

More particularly, the center portion 45 of the adjustable space cover lies behind the front surface of the branch units so as to clear the inner lip 47 of the flange member 33 of the cover frame yet provide a substantially dust-tight seal. The forward projecting margins 49 of the channel extend to the front surface of units, and the lips 47 along the side flanges 31 of the cover frame complete the seal. The rib-like portions 49 insure a good seal even when a part 51 of the unit section lies in a slightly different plane from other parts 53.

From the foregoing description, it will be apparent to those skilled in the art that the disclosed construction of panelboards offers substantial advantages in simplifying manufacturing operations. It is now possible to deliver panelboards as stock items without regard to variations in the capacity and character of the branch circuits. Although one such embodiment of the invention is disclosed in detail, modifications which do not depart from the spirit of the invention or the scope thereof, as set forth in the appended claims, will be apparent, and the description is therefore to be taken as illustrative rather than limiting.

Having thus described the invention, what is claimed and desired to be secured by Letters Patent is:

1. A panelboard comprising a cabinet, an elongate mounting back fixed within the cabinet, branch-unit sections secured along said mounting back to define a panel front of predetermined dimensions adjacent the front of the cabinet, a cover frame removably secured to the front of the cabinet in a plane slightly forward of said panel front, said cover frame having rearwardly projecting flange members defining an opening of a width substantially equal to that of said panel front and of a length greater than that of the panel front, and a space cover adjustably secured to the mounting back at the lower end against the lowermost branch-unit section, said space cover having a front portion equal in width to that of the panel front and otherwise extending beneath the flange member defining the lower edge of said opening.

2. A panelboard as set forth in claim 1, wherein the side flange members extend along the sides of the panel front and project rearwardly thereof, the front portion of said adjustable space cover being offset rearwardly of the panel front to clear the lowermost flange member.

3. A panelboard as set forth in claim 2, wherein said front portion of the adjustable space cover is in the shape of a channel, the upper and lower edges of which are formed as forwardly projecting flanges.

4. A panelboard supplied as a stock item comprising a cabinet, an elongate mounting back fixed within the cabinet to hold branch-unit sections of predetermined width, a cover frame removably secured to the front of said cabinet and having an elongate center opening of a width substantially equal to that of said branch-unit sections, a plate releasably secured to the mounting back adjacent but in rearwardly spaced relationship from the plane of the cover frame, said plate being located at the upper end of the opening in the panel and being of a width approximately equal to the width of said opening, and flange members projecting rearwardly from the cover frame about said opening, said flange members extending along and rearwardly of the upper and side edges of said plate, so that the cover panel is in part held against lateral movement by an interlocking cooperation between said plate and flange members, said panelboard further including a space cover adjustably secured to the mounting back at its lower end, said cover frame having an inwardly projecting flange member at the lower edge of its opening, and said adjustable space cover having a forward surface of a width approximately equal to the width of said opening in the cover frame and being positioned to extend beneath said lower flange member.

References Cited in the file of this patent

UNITED STATES PATENTS

| | | |
|---|---|---|
| Re. 23,797 | Miller | Mar. 9, 1954 |
| 1,930,028 | Adam | Oct. 10, 1933 |
| 2,276,226 | Cole | Mar. 10, 1942 |
| 2,359,247 | Rowe | Sept. 26, 1944 |
| 2,626,984 | Cole | Jan. 27, 1953 |